(12) United States Patent
Lin (10) Patent No.: US 10,069,252 B1
(45) Date of Patent: Sep. 4, 2018

(54) PLUG STRUCTURE OF LIGHT EMITTING AC ELECTRIC POWER CORD

(71) Applicant: Chia-hua Lin, New Taipei (TW)

(72) Inventor: Chia-hua Lin, New Taipei (TW)

( * ) Notice: Subject to any disclaimer, the term of this patent is extended or adjusted under 35 U.S.C. 154(b) by 0 days.

(21) Appl. No.: 15/915,250

(22) Filed: Mar. 8, 2018

(51) Int. Cl.
| | |
|---|---|
| *H01R 13/717* | (2006.01) |
| *H05B 33/08* | (2006.01) |
| *H01R 13/66* | (2006.01) |
| *H01R 24/28* | (2011.01) |
| *F21V 8/00* | (2006.01) |
| *H01R 103/00* | (2006.01) |

(52) U.S. Cl.
CPC ....... *H01R 13/7175* (2013.01); *G02B 6/0005* (2013.01); *H01R 13/665* (2013.01); *H01R 24/28* (2013.01); *H05B 33/083* (2013.01); *H05B 33/089* (2013.01); *H05B 33/0812* (2013.01); *H01R 2103/00* (2013.01)

(58) Field of Classification Search
CPC .......................... H01R 13/717; H01R 12/7175
USPC .......................................................... 439/490
See application file for complete search history.

(56) References Cited

U.S. PATENT DOCUMENTS

| | | | | |
|---|---|---|---|---|
| 5,554,049 | A * | 9/1996 | Reynolds ............ | H01R 13/6658 439/490 |
| 9,373,921 | B1 * | 6/2016 | Lin ....................... | H01R 25/003 |
| 9,620,903 | B2 * | 4/2017 | Joo ......................... | H01R 13/53 |
| 2004/0071410 | A1 * | 4/2004 | Ma ...................... | H01R 13/6641 385/88 |
| 2005/0124209 | A1 * | 6/2005 | Currie ................ | H01R 13/7172 439/490 |
| 2015/0364853 | A1 * | 12/2015 | Thijssen ................. | F21V 23/06 439/660 |
| 2017/0033514 | A1 * | 2/2017 | Wang ................. | H01R 13/7175 |

OTHER PUBLICATIONS

Chia-hua Lin "U.S. Appl. No. 15/904,815, filed Feb. 26, 2018" USPTO, USA.
Chia-hua Lin "U.S. Appl. No. 15/707,147, filed Sep. 18, 2017" USPTO, USA.

* cited by examiner

*Primary Examiner* — Neil Abrams
(74) *Attorney, Agent, or Firm* — WPAT, PC (57) ABSTRACT

A plug structure of light emitting AC electric power cord is disclosed, wherein a plug body is internally combined with a circuit board which comprises at least a circuit device and at least two conductive board, and the circuit device includes at least two light emitting diodes (LEDs) respectively corresponding to a light guiding line within the electric power cord; accordingly, when the conductive board transfers AC power to the two LEDs, the circuit device can controls such two LEDs to glow at different moments in order to create an image persistence difference of one parallax thereby allowing human eyes to generate the image persistence effect in vision such that the light guiding line may present a visual perception of light flowing.

7 Claims, 9 Drawing Sheets

PLUG STRUCTURE OF LIGHT EMITTING AC ELECTRIC POWER CORD

BACKGROUND OF THE INVENTION

1. Field of the Invention

The present invention generally relates to a plug structure of light emitting AC electric power cord; in particular, it relates to a plug structure of electric power cord capable of controlling two light emitting diodes (LEDs) to illuminate alternately at different time points such that two light guiding lines receive the created light at different moment in order to constitute the visual persistence effect thereby presenting a light-flowing visual effect.

2. Description of Related Art

At present, household appliances draw electric power from the electric power sockets by using a plug, so the use of electricity has become a portion of everybody's family lives; additionally, in a generally known power outlet, there may be installed with a sort of light emitting device inside the plug body so as to provide light in the dark state, thus indicating the location of the power outlet to the user.

But, since the electric power cord and the power plug extending directly from the electronic device itself typically are unable to show whether the electric power has been conducted or not, it is quite desirable to install a sort of light emitting circuit inside the conventional electric power plug and to provide a light guiding line contained within the electric power cord so that the light guiding line can extend from the electric power cord to the electric power plug, such that, when the electric power plug is inserted into the power supply socket, the conductive connection of electricity from the power outlet can enable the light emitting components included in the light emitting circuit to illuminate, thereby allowing the light to travel into the light guiding line to transfer and glow; moreover, the electric power cord may be made of translucent materials so the light emitted from the light guiding line can penetrate the electric power cord thus allowing the user to see the illuminating power line, which may offer an optimal solution for the above-mentioned issues.

Also, the applicant of the present invention has submitted the U.S. patent application Ser. No. 15/707,147 on Sep. 18, 2017 and the U.S. patent application Ser. No. 15/904,815 on Feb. 26, 2018.

SUMMARY OF THE INVENTION

The present invention discloses a plug structure of light emitting AC electric power cord, comprising: a plug body, with one end thereof being connected to an electric power cord having a translucent cladding, wherein the inside of the electric power cord includes multiple power lines for transferring alternative current (AC), a first light guiding line and a second light guiding line, and the front ends of such power lines, the first light guiding line and the second light guiding line respectively extend into the plug body, while the other end of the plug body not installed with the electric power cord is configured in exposure with a set of conductive slices such that the power lines can be electrically connected to the tail ends of the neutral wire conductive slice and the live wire conductive slice respectively, thereby conducting electric power to the output ends of the power lines, and the plug body is also internally installed in combination with a seat body, a circuit board, a light condenser as well as a cover board; wherein one surface of the seat body includes a positioning space, and each of the two lateral sides of the seat body has an abutment surface on which a slot is installed; wherein the circuit board includes a circuit device and at least two conductive boards, the circuit device comprises a first light emitting diode (LED) and a second LED, and the circuit board is accommodated and positioned within the positioning space in the seat body such that the two conductive boards are located in the slot of the seat body and close to the abutment surface; wherein the light condenser has a lid internally including a first accommodation space and a second accommodation space, and a first hollow column and a second hollow column respectively extend from the first accommodation space and the second accommodation space, in which the first accommodation space and the second accommodation space of the lid individually cover the first LED and the second LED such that the first LED and the second LED respectively correspond to the first hollow column and the second hollow column; wherein the cover board has a positioning part which internally includes a first through-hole and a second through-hole penetrating the cover board; also, the cover board can be locked to the seat body by means of several lock-up elements so as to fix the circuit board into the seat body in closure so that the first hollow column and the second hollow column of the light condenser respectively enter into the first through-hole and the second through-hole, thus that the front end edges of the first light guiding line and the second light guiding line respectively enter into the first hollow column and the second hollow column; wherein the neutral wire conductive slice and the live wire conductive slice in the set of conductive slices are tightly inserted in position into the slots of the seat body such that the neutral wire conductive slice and the live wire conductive slice are directly in contact with the two conductive boards, respectively, so as to conduct electric power to the two conductive boards; wherein the circuit device includes: a live wire connection end, electrically connected to one of the conducive boards; a central wire connection end, electrically connected to the other conducive board; a first current limiting resistor, electrically connected to the live wire connection end; a constant current control circuit, electrically connected to the first current limiting resistor and used to control the current inputted via the first current limiting resistor as a constant current output; a set of light emitting circuits, electrically connected to the constant current control circuit in order to allow the current outputted by the constant current control circuit to drive the set of the light emitting circuits to operate; and the set of the light emitting circuits includes at least two connected-in-series sets of a first illuminating module and a second illuminating module, in which the first illuminating module includes a first microcontroller and a first LED connected in series to the first microcontroller, the second illuminating module includes a second microcontroller and a second LED connected in series to the second microcontroller, and the first microcontroller and the second microcontroller respectively control the first LED and the second LED to light on and off at different moments, such that the light generated at intervals by the first LED and the second LED can be concentrated and projected into the first hollow column and the second hollow column via the lid on the light condenser so that the first light guiding line and the second light guiding line respectively receive such intermittent and alternate light sources thus allowing them to travel through the translucent cladding to constitute a visual persistence effect and, accordingly, present a seemingly water-flowing visual perception; a protection circuit, electrically connected to the constant current control circuit, the set of light emitting circuits and the central wire connection end and used to protect the circuitry to avoid circuit damage issues possibly caused by excessive current; and an output current setup circuit, electrically connected to the constant current control circuit, the protection circuit and the central wire connection end, and used to limit the maximum operating current outputted by the constant current control circuit.

In a preferred embodiment, the first light guiding line and the second light guiding line are of a light fiber line material.

In a preferred embodiment, a recess part is configured on the abutment surface of the seat body close to the surface of the positioning space, and a notch is configured on the end part on a common wall of the recess part and the positioning space; meanwhile, the two conductive boards of the circuit board have a blocking board, a joint plate extends in bend from the blocking board such that the circuit board can be accommodated in position inside the positioning space of the seat body so the blocking board of the two conductive boards is located within the notch of the seat body and the extension plate is positioned within the recess part; when the blocking board is stopped and held by the notch, the circuit board can not move forwards and positioned within the positioning space of the seat body, thereby allowing the joint plate to be jointed in contact with the neutral wire conductive slice and the live wire conductive slice.

In a preferred embodiment, the cross-sectioned view of the conductive board is L-shaped, and a flange is configured on the joint plate.

In a preferred embodiment, the tail ends of both the neutral wire conductive slice and the live wire conductive slice are respectively configured with a terminal whose width is greater than the neutral wire conductive slice and the live wire conductive slice such that the terminal can be stopped by the blocking board of the conductive board and can not move forwards thereby allowing the terminal to joint to the blocking board.

In a preferred embodiment, a positioning hole is configured on the seat body and used to allow a ground wire conductive pillar to penetrate there through for connection.

In a preferred embodiment, the output ends of the power lines are connected to a power supply device or an appliance device such that AC power can be conducted into the circuit board and, at the same time, also transferred to the power supply device or the appliance device by way of the power lines.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1A:
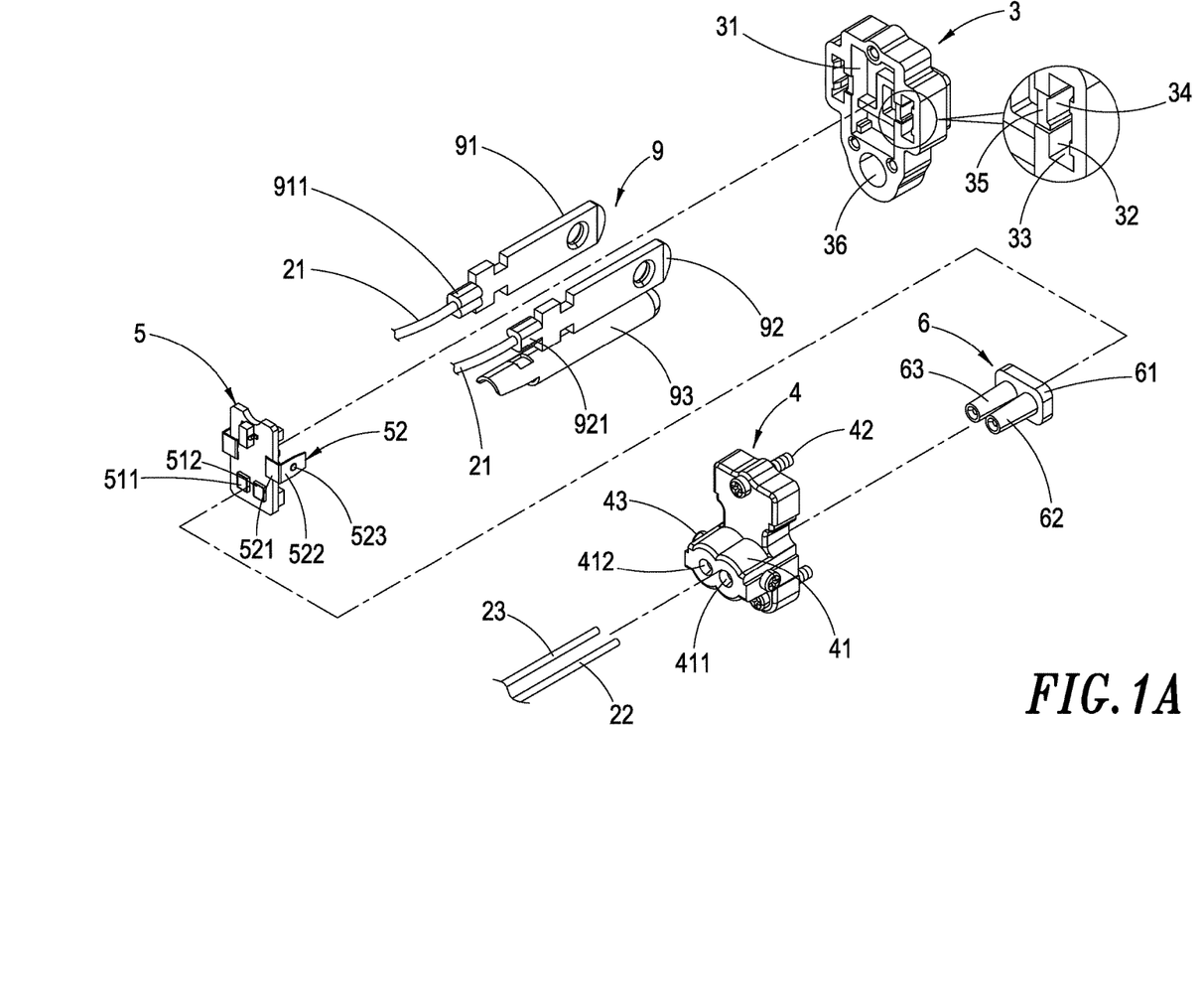
FIG. 1A shows a partial stereo structural disassembly view of the plug structure of light emitting AC electric power cord according to the present invention.
Figure 1B:
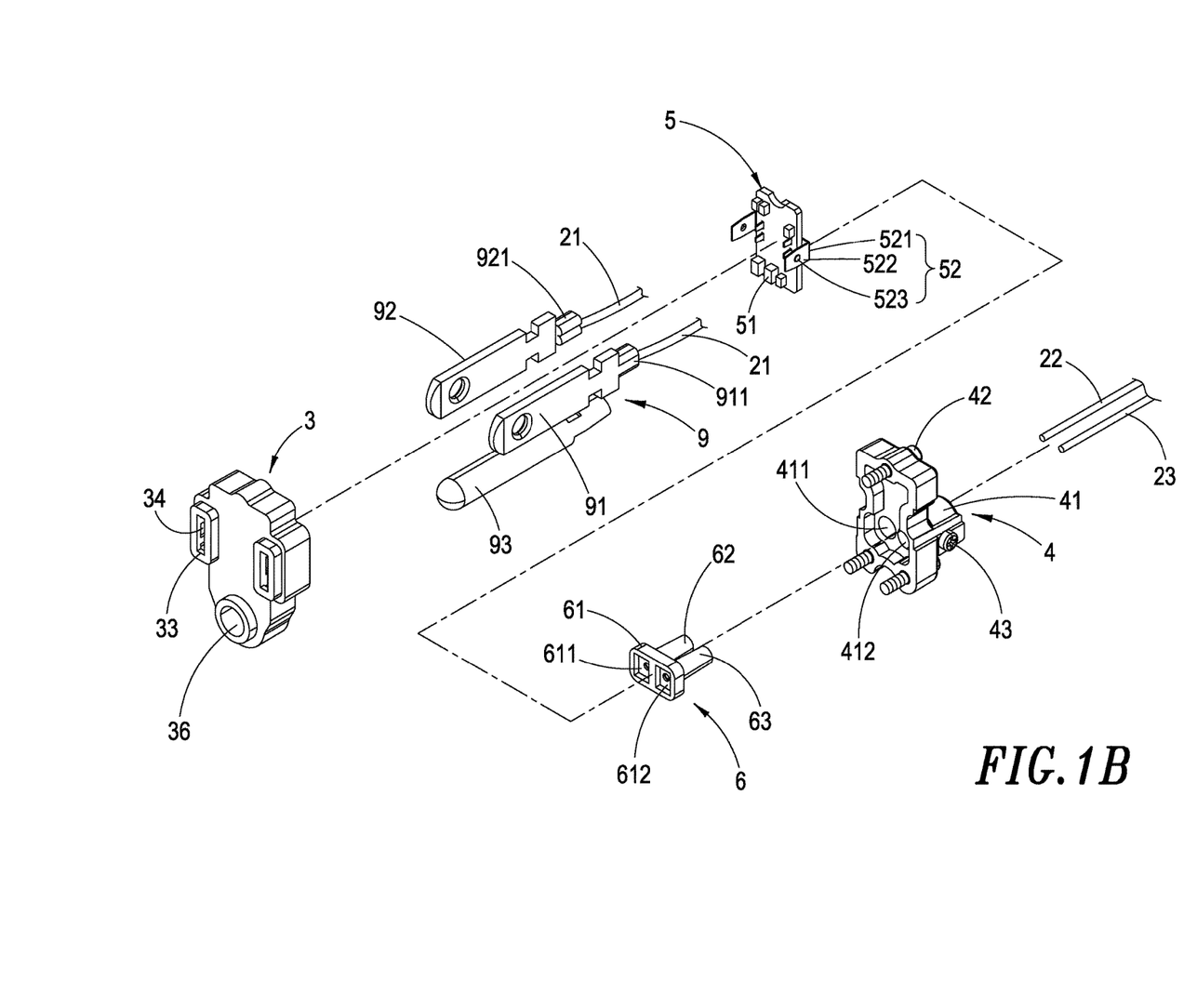
FIG. 1B shows a partial stereo structural disassembly view at another angle of the plug structure of light emitting AC electric power cord according to the present invention.
Figure 1C:
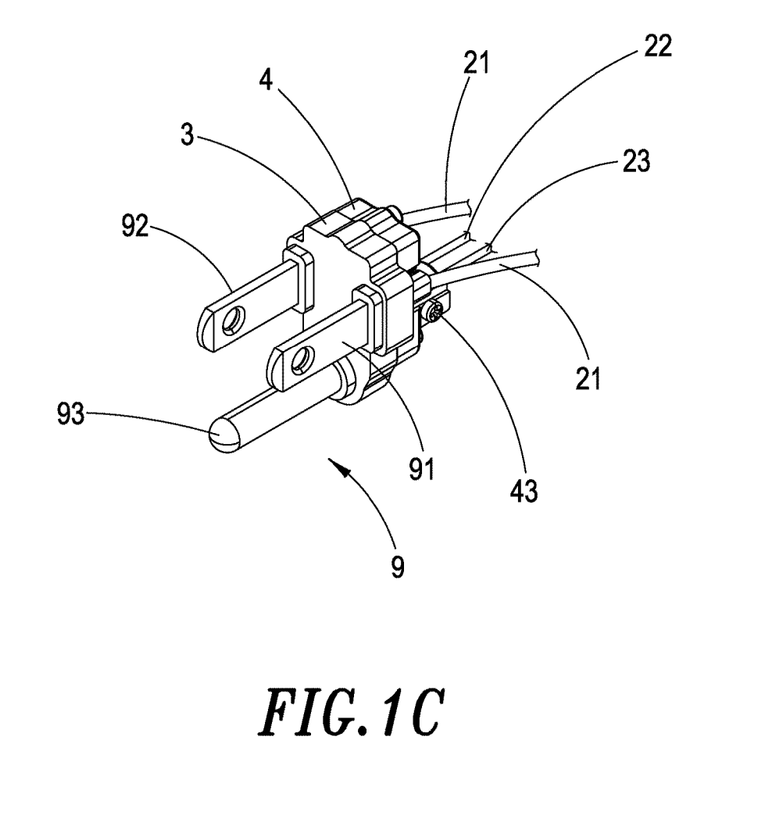
FIG. 1C shows a partial stereo structural assembly view of the plug structure of light emitting AC electric power cord according to the present invention.
Figure 1D:
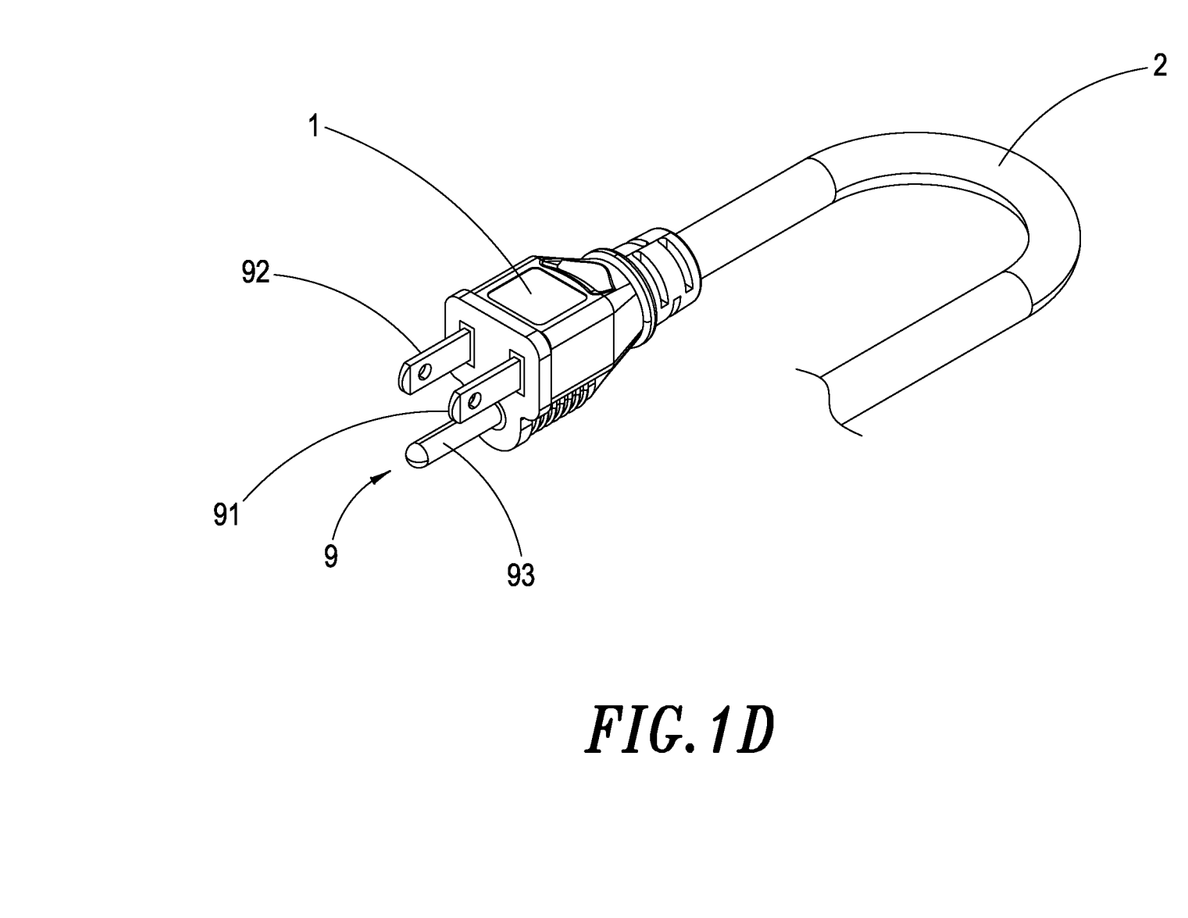
FIG. 1D shows a stereo structural assembly view of the plug structure of light emitting AC electric power cord according to the present invention.
Figure 1E:
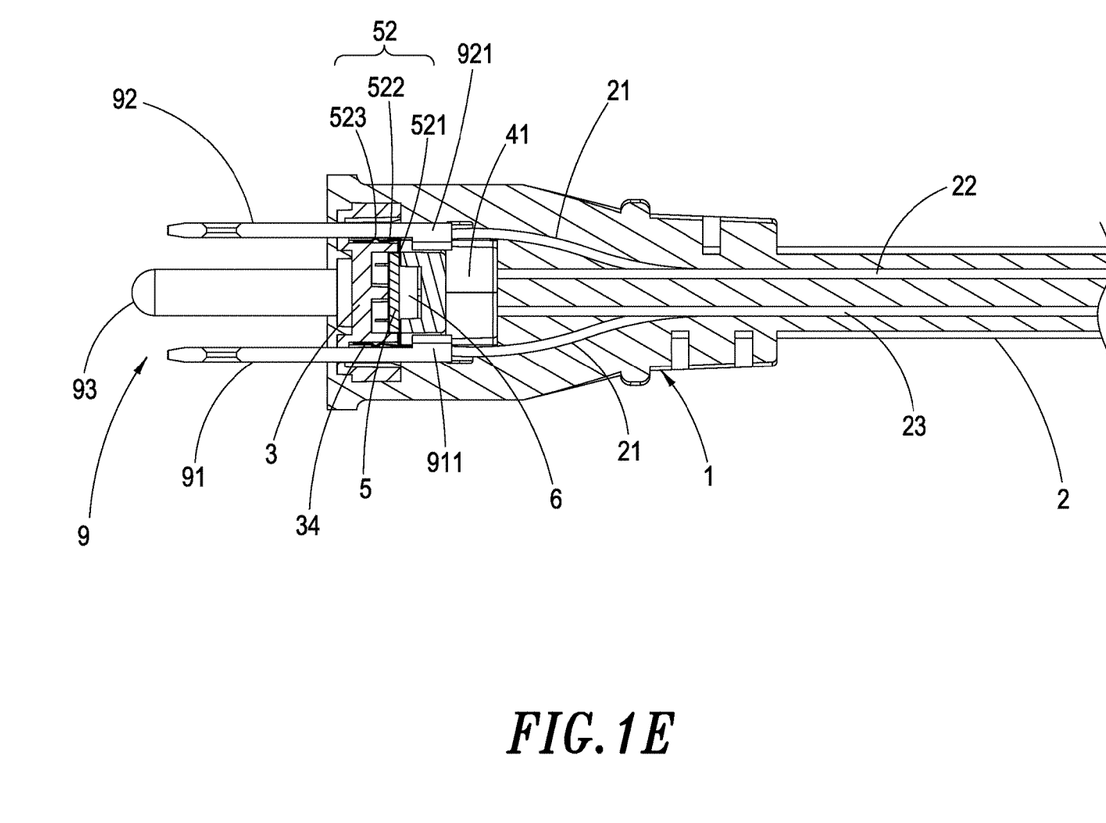
FIG. 1E shows a cross-sectioned structural view of the plug structure of light emitting AC electric power cord according to the present invention.
Figure 1F:
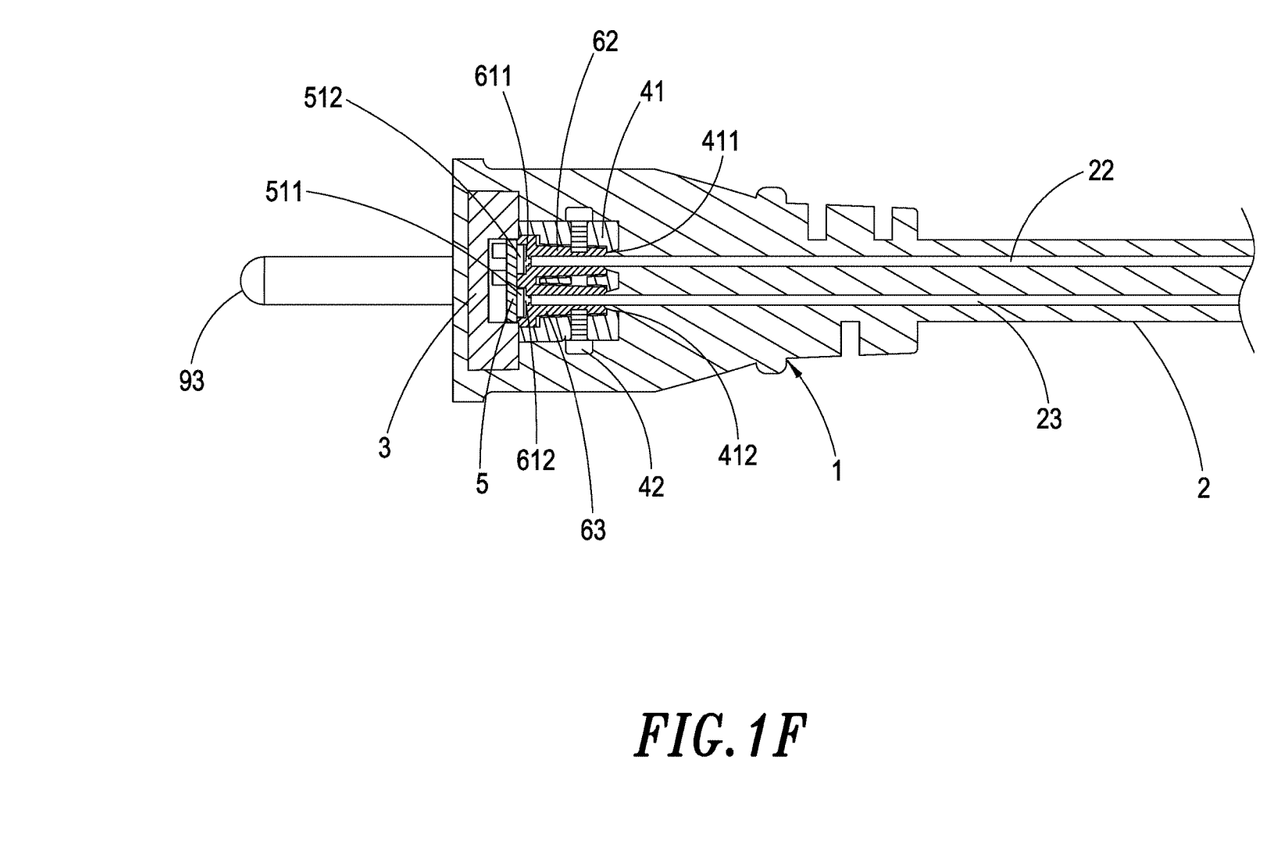
FIG. 1F shows a cross-sectioned structural view of the plug structure of light emitting AC electric power cord according to the present invention.

Refer initially to FIGS. 1A-1F, wherein a plug structure of light emitting AC electric power cord according to the present invention are shown. Refer first to FIGS. 1D, 1E and 1F, it can be seen that the present invention essentially comprises a plug body 1, an electric power cord 2, a seat body 3, a cover board 4, a circuit board 5 and a light condenser 6, and a set of conductive slices 6 protrudes from the other end of the plug body 2 not connected to the electric power line 2.

Herein the electric power cord 2 is formed by a translucent cladding, and internally includes multiple power lines 21 used to transfer alternative current (AC), a first light guiding line 22 and a second light guiding line 23, in which the first light guiding line 22 and the second light guiding line 23 are made of light fiber materials, and the front ends of the first light guiding line 22 and the second light guiding line 23 both extend into the plug body 1.

Next, refer to FIGS. 1A-1F, wherein one surface of the seat body 3 has a positioning space 31, each of the two lateral sides on the seat body 3 has an abutment surface 32, a slot 33 is configured on the abutment surface 32 and a recess part 34 is configured on the abutment surface 32 close to the surface of the positioning space 31, in which the recess part 34 is located inside the slot 33, and a notch 35 is set up on the end part of a common wall of the recess part 34 and the positioning space 31.

Herein the circuit board 5 includes a circuit device 51 and at least two conductive boards 52, the cross-sectioned profiles of such two conductive boards 52 are largely L-shaped; and there is also a blocking board 521, a joint plate 522 extends in bend from the blocking board 521, a flange 523 protrudes from the external surface of the joint plate 522, such that the circuit board 5 can be accommodated in position inside the positioning space 31 of the seat body 3, so the blocking board 521 of the two conductive boards 52 is located within the notch 35 of the seat body 3 and the joint plate 522 is positioned within the recess part 34 of the slot 33, thus that the blocking board 521 is stopped and held by the notch 35 and the circuit board 5 can not move forwards and positioned within the positioning space 31 of the seat body 3.

Figure 2:
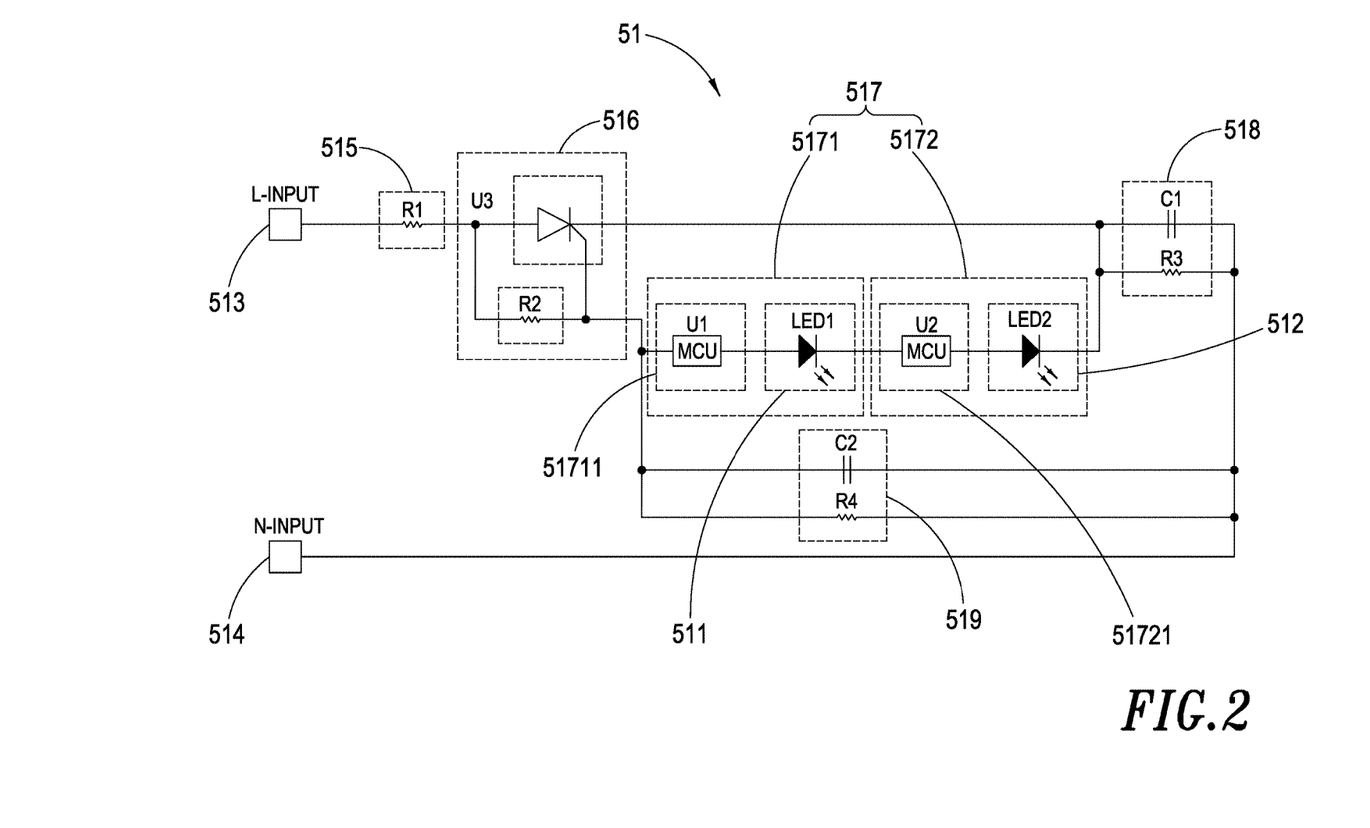
FIG. 2 shows a circuit diagram of the plug structure of light emitting AC electric power cord according to the present invention.

Subsequently, as shown in FIG. 2, the circuit device 51 includes a live wire connection end 513, a central wire connection end 514, a first current limiting resistor 515 electrically connected to the live wire connection end 513, a constant current control circuit 516, a set of light emitting circuits 517, a protection circuit 518 as well as an output current setup circuit 519. Herein the constant current control circuit 516 is used to control the current inputted via the first current limiting resistor 515 as a constant current output, the first current limiting resistor 515 and the protection circuit 518 are applied to protect the circuit device 51 to avoid damage issues possibly caused by excessive current, in which the protection circuit 518 features essentially the grounding protection and is connected to the central wire connection end 514; besides, the output current setup circuit 519 is used to limit the maximum operating current outputted by the constant current control circuit 516.

Moreover, the constant current outputted by the constant current control circuit 516 can drive the set of light emitting circuits 517 to operate, and the set of light emitting circuits 517 includes at least two connected-in-series sets of a first illuminating module 5171 and a second illuminating module 5172, in which the first illuminating module 5171 includes a first microcontroller 51711 and a first LED 511 connected in series to the first microcontroller 51711, the second illuminating module 5172 includes a second microcontroller 51721 and a second LED 512 connected in series to the second microcontroller 51721; in addition, the first LED 511 and the second LED 512 respectively correspond to the first through-hole 411 and the second through-hole 412, thus further corresponding to the first light guiding line 22 and the second light guiding line 23; herein the first microcontroller 51711 and the second microcontroller 51721 respectively control the light ON and OFF in the first LED 511 and the second LED 512 such that the first LED 511 and the second LED 512 glow alternately and repeatedly at different time points.

Additionally, such two conductive boards 52 are respectively electrically connected to the live wire connection end 513 and the central wire connection end 514 so that AC power can be conducted to these two conductive boards 52 by way of the central wire conductive plate 32 and the live wire conductive plate 33 and then further transferred to the circuit device 51 to drive the first LED 511 and the second LED 512 to illuminate.

Meanwhile, the light condenser 6 has a lid 61 which internally includes a first accommodation space 611 and a second accommodation space 612, and a first hollow column 62 and a second hollow column 63 extend respectively from the first accommodation space 611 and the second accommodation space 612, in which the lid 61 covers the first LED 511 and the second LED 512 such that the first LED 511 is accommodated within the first accommodation space 611 and corresponds to the first hollow column 62, while the second LED 512 is accommodated within the second accommodation space 612 and corresponds to the second hollow column 63, thereby allowing the light generated by the first LED 511 and the second LED 512 to converge and then be projected into the first hollow column 62 and a second hollow column 63.

Furthermore, the cover board 4 includes a positioning part 41 which internally has a first through-hole 411 and a second through-hole 412 penetrating the cover board 4; the first hollow column 62 of the light condenser 6 enters into the first through-hole 411 and the second hollow column 63 into the second through-hole 412, so the front end edge of the first light guiding line 22 can go into the first hollow column 62 and the second light guiding line 23 into the second hollow column 63, such that the first light guiding line 22 and second light guiding line 23 are placed in position and receive the light projected from the first LED 511 and the second LED 512; herein the cover board 4 can be locked to the seat body 3 by means of several lock-up elements 42 so as to fix the circuit board 5 into the seat body 3 in closure.

Moreover, the lateral sides of the cover board 4 may be respectively installed with a positioning element 43 which can be a screw and penetrate into the first through-hole 411 and the second through-hole 412 so as to press coercively the first hollow column 62 and the second hollow column 63 of the light condenser 6 into the first through-hole 411 and the second through-hole 412 by means of this positioning element 43.

Herein the set of conductive slices 9 comprises at least a neutral wire conductive slice 91 and a live wire conductive slice 92, and each of the tail ends of the neutral wire conductive slice 91 and the live wire conductive slice 92 has a terminal 911, 921, with the width of such terminals 911, 921 being greater than the neutral wire conductive slice 91 and the live wire conductive slice 92, such that the neutral wire conductive slice 91 and the live wire conductive slice 92 may be tightly inserted into the slot 33 of the seat body 3 in position, and the terminals 911, 921 on the tail ends of the neutral wire conductive slice 91 and the live wire conductive slice 92 are stopped by the blocking board 521 of the conductive board 52 and can not move forwards, thereby that such terminals 911, 921 can be placed in contact with the blocking board 521 on the two conductive boards 52 of the circuit board 4; in addition, with the installation of the flange 523, this can further ensure the close joints between the joint plates 522 of the two conductive boards 52 and the neutral wire conductive slice 91 and the live wire conductive slice 92 so as to guide AC power directly to the two conductive boards 522; also, the depth of the recess part 34 is greater than the width of the joint plate 522 so that, when the joint plate 522 is pushed and pressed by the neutral wire conductive slice 91 and the live wire conductive slice 92, it is possible to make the joint plate 522 move a distance towards the wall face of the recess part 34 in order to create an elastic force, thus ensuring the close joint between the joint plate 522 and the neutral wire conductive slice 91 and the live wire conductive slice 92.

Besides, it is also possible to additionally set up a positioning hole 36 on the seat body 3 based on demands thereby allowing a ground wire conductive pillar 93 to penetrate through it for connection.

Herein the seat body 3 internally combined with the set of conductive slices 9, the circuit board 5, the light condenser 6 and the cover board 4 is accommodated in position into the plug body 1 such that the power lines 21 can be electrically connected to the respective terminals at the tail ends of the neutral wire conductive slice 91 and the live wire conductive slice 92 so as to guide AC power to the output ends of the electric power cord 2, while the neutral wire conductive slice 91, the live wire conductive slice 92 and the ground wire conductive pillar 93 are exposed outside the plug body 1.

Figure 3A:
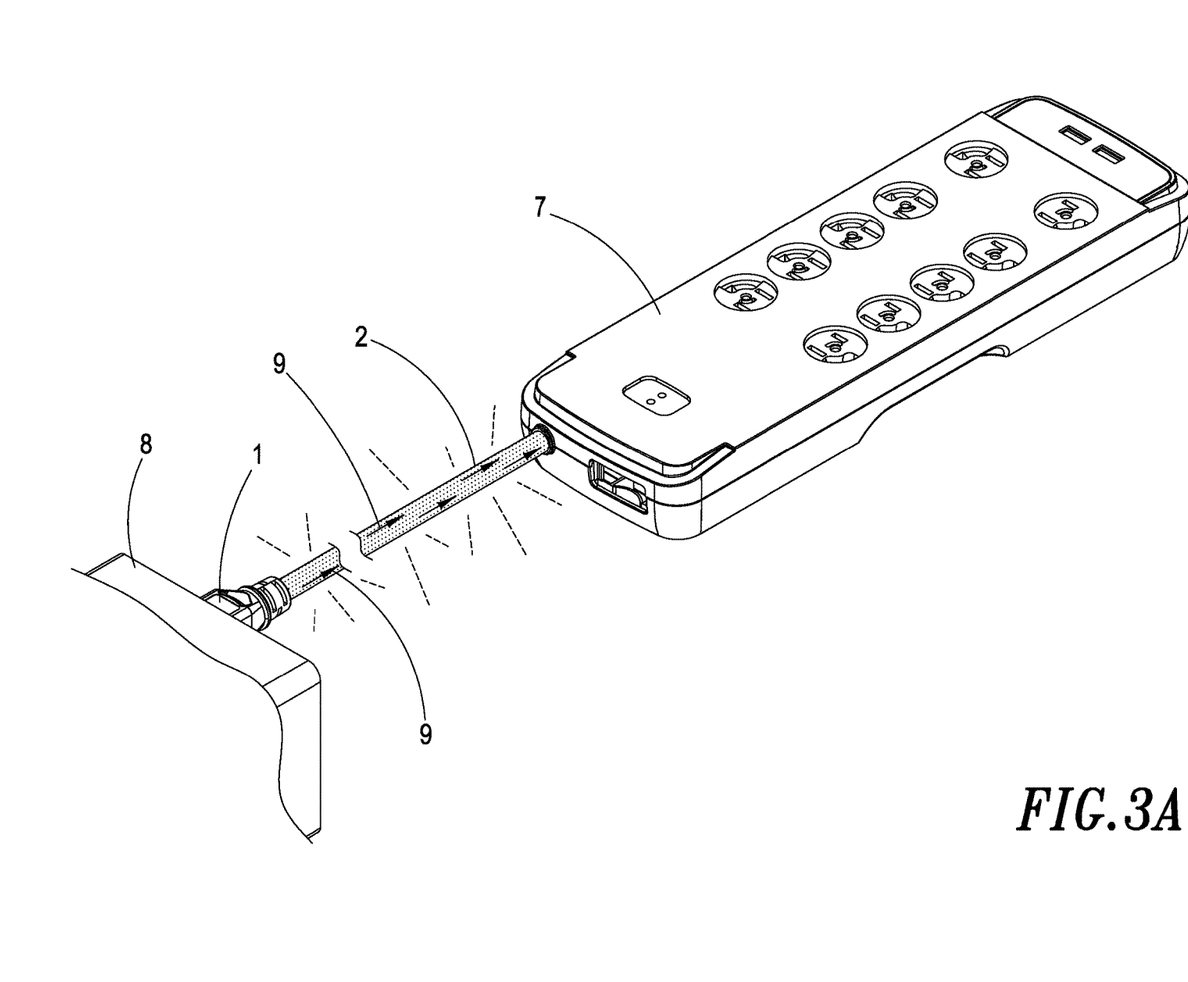
FIG. 3A shows an application view in an embodiment of the plug structure of light emitting AC electric power cord according to the present invention.
Figure 3B:
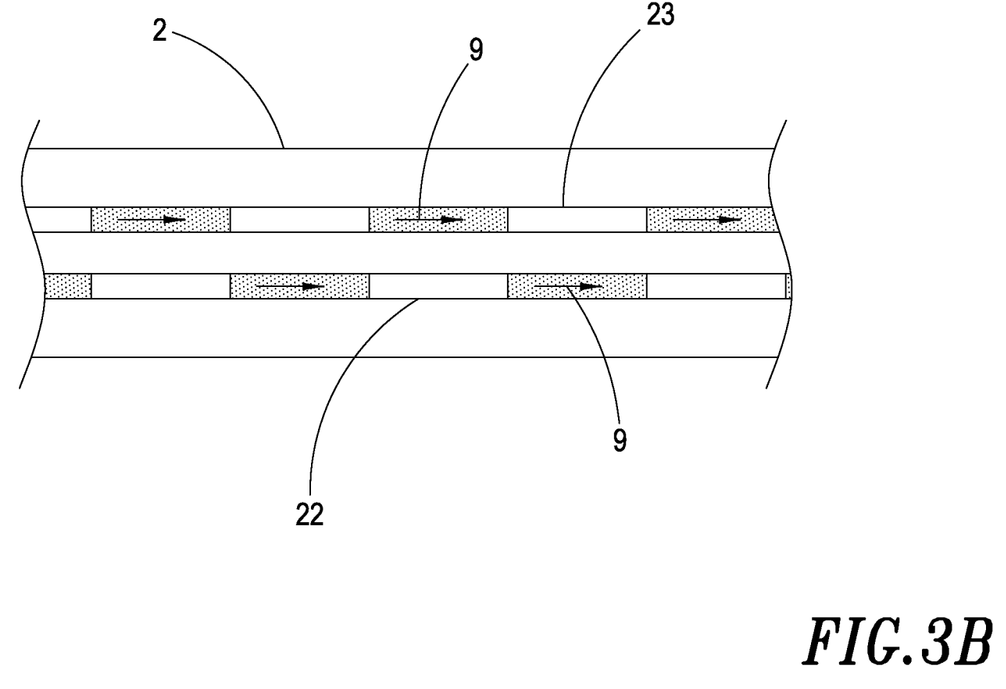
FIG. 3B shows a visual persistence light-flowing view on the plug structure of light emitting AC electric power cord according to the present invention.

Furthermore, as shown in FIGS. 3A and 3B, the other end of the electric power cord 2 is connected to a device 7 (herein the device 7 may be an extension line socket or an electronic device requiring AC power supply via the electric power cord), and, after plugging the set of conductive slices 9 into a power socket 8, AC power can be directly conducted into the circuit device 51 through the live wire connection end 513 and the central wire connection end 514 by way of the two conductive boards 52 so as to make the first illuminating module 5171 and the second illuminating module 5172 within the set of light emitting circuits 517 operate; also, the first microcontroller 51711 and the second microcontroller 51712 drive the first LED 511 and the second LED 512 to illuminate at different time points to glow alternately;

for example, when the first LED 511 emits light, the second LED 512 is off; on the contrary, when the first LED 511 is off, the second LED 512 glows; also, as shown in FIG. 3B, the light sources 9 created by the first LED 511 and the second LED 512 will be transferred to the first light guiding line 22 and the second light guiding line 23 such that the first light guiding line 22 and the second light guiding line 23 can emit light accordingly and the light sources 9 within the first light guiding line 22 and the second light guiding line 23 occur alternately and intermittently in a flow-wise way; therefore, the light sources 9 in the first light guiding line 22 and the second light guiding line 23 then travel out of the translucent cladding to create a visual persistence effect in a human eye so as to present a water-flow effect of the light sources 9 in the light guiding lines 22, 23 to the outside.

In comparison with other conventional technologies, the plug structure of light emitting AC electric power cord according to the present invention provides the following advantages:

(1) the present invention is characterized in that a plurality of light guiding lines are buried in the electric power cord and a circuit board is configured within the power plug such that each light guiding line corresponds to an LED, thus that, upon inserting the power plug into a power socket, it is possible to control each LED to glow alternately in order to let the plurality of light guiding lines also illuminate alternately, and the light from such light guiding lines can go through the translucent electric power cord to generate a visual persistence effect so that a user can perceive the flowing light from the electric power cord;

(2) the present invention uses the LED as the light sources so as to be able to simplify the circuit design for AC-to-DC conversions, thus minimizing the circuit and, accordingly, obtaining a relatively smaller integral circuit board, which facilitates convenient assemblage within the electric power plug without having to modify the size and profile of the electric power plug;

(3) the present invention directly attaches the two conductive boards to the conductive slices for power transfer in order to reduce the wiring time thereby providing cost-saving and fast assemblage effects;

(4) in the present invention, the circuit board and the light guiding line are installed within a conventional electric power cord, so it needs not to greatly alter the structure of the electric power cord to allow the electric power cord to have the intended electric conductivity and illumination effects.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A plug structure of light emitting AC electric power cord, comprising:
   a plug body, with one end thereof being connected to an electric power cord having a translucent cladding, wherein the inside of the electric power cord includes multiple power lines for transferring alternative current (AC), a first light guiding line and a second light guiding line, and the front ends of such power lines, the first light guiding line and the second light guiding line respectively extend into the plug body, while the other end of the plug body not installed with the electric power cord is configured in exposure with a set of conductive slices such that the power lines can be electrically connected to the tail ends of the neutral wire conductive slice and the live wire conductive slice respectively, thereby conducting electric power to the output ends of the power lines, and the plug body is also internally installed in combination with a seat body, a circuit board, a light condenser as well as a cover board;
   wherein one surface of the seat body includes a positioning space, and each of the two lateral sides of the seat body has an abutment surface on which a slot is installed;
   wherein the circuit board includes a circuit device and at least two conductive boards, the circuit device comprises a first light emitting diode (LED) and a second LED, and the circuit board is accommodated and positioned within the positioning space in the seat body such that the two conductive boards are located in the slot of the seat body and close to the abutment surface;
   wherein the light condenser has a lid internally including a first accommodation space and a second accommodation space, and a first hollow column and a second hollow column respectively extend from the first accommodation space and the second accommodation space, in which the first accommodation space and the second accommodation space of the lid individually cover the first LED and the second LED such that the first LED and the second LED respectively correspond to the first hollow column and the second hollow column;
   wherein the cover board has a positioning part which internally includes a first through-hole and a second through-hole penetrating the cover board; also, the cover board can be locked to the seat body by means of several lock-up elements so as to fix the circuit board into the seat body in closure so that the first hollow column and the second hollow column of the light condenser respectively enter into the first through-hole and the second through-hole, thus that the front end edges of the first light guiding line and the second light guiding line respectively enter into the first hollow column and the second hollow column;
   wherein the neutral wire conductive slice and the live wire conductive slice in the set of conductive slices are tightly inserted in position into the slots of the seat body such that the neutral wire conductive slice and the live wire conductive slice are directly in contact with the two conductive boards, respectively, so as to conduct electric power to the two conductive boards; and,
   wherein the circuit device includes:
      a live wire connection end, electrically connected to one of the conducive boards;
      a central wire connection end, electrically connected to the other conducive board;
      a first current limiting resistor, electrically connected to the live wire connection end;
      a constant current control circuit, electrically connected to the first current limiting resistor and used to control the current inputted via the first current limiting resistor as a constant current output;
      a set of light emitting circuits, electrically connected to the constant current control circuit in order to allow the current outputted by the constant current control circuit to drive the set of the light emitting circuits to operate; and the set of the light emitting circuits includes at least two connected-in-series sets of a first illuminating module and a second illuminating module, in which the first illuminating module includes a first microcontroller and a first LED connected in series to the first microcontroller, the second illuminating module includes a second microcontroller and a second LED connected in series to the second microcontroller, and the first microcontroller and the second microcontroller respectively control the first LED and the second LED to light on and off at different moments, such that the light generated at intervals by the first LED and the second LED can be concentrated and projected into the first hollow column and the second hollow column via the lid on the light condenser so that the first light guiding line and the second light guiding line respectively receive such intermittent and alternate light sources thus allowing them to travel through the translucent cladding to constitute a visual persistence effect and, accordingly, present a seemingly water-flowing visual perception;

a protection circuit, electrically connected to the constant current control circuit, the set of light emitting circuits and the central wire connection end and used to protect the circuitry to avoid circuit damage issues possibly caused by excessive current; and an output current setup circuit, electrically connected to the constant current control circuit, the protection circuit and the central wire connection end, and used to limit the maximum operating current outputted by the constant current control circuit.

2. The plug structure of light emitting AC electric power cord according to claim 1, in which the first light guiding line and the second light guiding line are of a light fiber line material.

3. The plug structure of light emitting AC electric power cord according to claim 1, in which a recess part is configured on the abutment surface of the seat body close to the surface of the positioning space, and a notch is configured on the end part on a common wall of the recess part and the positioning space; meanwhile, the two conductive boards of the circuit board have a blocking board, a joint plate extends in bend from the blocking board such that the circuit board can be accommodated in position inside the positioning space of the seat body so the blocking board of the two conductive boards is located within the notch of the seat body and the extension plate is positioned within the recess part; when the blocking board is stopped and held by the notch, the circuit board can not move forwards and positioned within the positioning space of the seat body, thereby allowing the joint plate to be jointed in contact with the neutral wire conductive slice and the live wire conductive slice.

4. The plug structure of light emitting AC electric power cord according to claim 3, in which the cross-sectioned view of the conductive board is L-shaped, and a flange is configured on the joint plate.

5. The plug structure of light emitting AC electric power cord according to claim 4, in which the tail ends of both the neutral wire conductive slice and the live wire conductive slice are respectively configured with a terminal whose width is greater than the neutral wire conductive slice and the live wire conductive slice such that the terminal can be stopped by the blocking board of the conductive board and can not move forwards thereby allowing the terminal to joint to the blocking board.

6. The plug structure of light emitting AC electric power cord according to claim 1, in which a positioning hole is configured on the seat body and used to allow a ground wire conductive pillar to penetrate for connection.

7. The plug structure of light emitting AC electric power cord according to claim 1, in which the output ends of the power lines are connected to a power supply device or an appliance device such that AC power can be conducted into the circuit board and, at the same time, also transferred to the power supply device or the appliance device by way of the power lines.

* * * * *